United States Patent [19]

Strahl

[11] 3,926,645

[45] Dec. 16, 1975

[54] SYMPATHETIC INK

[76] Inventor: Walter Strahl, 185 W. End Ave., New York, N.Y. 10023

[22] Filed: Jan. 25, 1974

[21] Appl. No.: 436,646

[52] U.S. Cl. .................. 106/21; 106/26; 106/190; 106/197 R
[51] Int. Cl.$^2$.................. C09D 11/00; C09D 11/14
[58] Field of Search ........... 106/21, 22, 23, 26, 190, 106/197 R

[56] References Cited
UNITED STATES PATENTS

| | | | |
|---|---|---|---|
| 2,228,033 | 1/1941 | Martone | 106/21 X |
| 2,740,723 | 4/1956 | Voris | 106/197 R X |
| 2,814,618 | 11/1957 | Sloan | 106/197 R X |
| 3,093,242 | 6/1963 | Huyck et al. | 106/21 X |
| 3,420,635 | 1/1969 | Davis | 106/21 X |

OTHER PUBLICATIONS

"Ethocel," The Dow Chemical Co., Midland, Michigan, Reprinted from "Plastic Materials and Plasticizers" published in 1938.

Primary Examiner—Joan E. Welcome
Attorney, Agent, or Firm—John J. Hart

[57] ABSTRACT

An improved sympathetic ink is composed of a substantially water insoluble cellulose ether such as ethyl cellulose and methylene chloride or a solvent containing methylene chloride, preferably a mixture of methylene chloride and trichloro ethylene.

5 Claims, No Drawings

SYMPATHETIC INK

BACKGROUND OF THE INVENTION

1. Field of the Invention

The present invention relates to a sympathetic or invisible ink and more particularly to an improved sympathetic ink which, after applying it to a suitable base such as paper, fabrics, or the like carrier material which can be written or printed on, is invisible but which becomes visible when wetting said base carrying the writing or printing thereon, with water, to a process of making such an ink, and to a method of using same, for instance, for identifying the carrier material.

2. Description of the Prior Art

Sympathetic inks which become visible when the carrier material such as paper, fabrics, or the like, on which characters are written or printed with such an ink, is wetted with water, are known. Thus, for instance, an ink which contains phenolphthalein dissolved in ethanol and containing carbon tetrachloride to reduce its inflammability, glycerol as thickening agent, and acetone as solubilizing aid for the glycerol has been described. Such an ink, however has a relatively high evaporation rate and vapor pressure at room temperature. Furthermore, it is hygroscopic due to the presence of glycerol therein which causes the ink to spread on application to the carrier material. As a result thereof it is not possible to produce clear and sharp writings or printings on the surfaces to which the ink is applied. In addition thereto, the ink requires for its development the use of an alkaline solution.

Another type of invisible ink comprises a solution of a water-repellent substance such as a colorless wax or wax-like substance, for instance, paraffin in a liquid having a moderate rate of evaporation such as a mixture of xylene and tetrachloro ethane. After printing paper or other materials with such an ink, the liquid evaporates and leaves fine particles of the water-repellent substance deposited on the fibers of the material. This deposit is invisible but becomes visible on moistening the paper or material due to the absorption of water by the unimpregnated portions of the paper or the like material. However, prints produced with such an invisible ink are not very sharp and not well distinguished from the moistened, somewhat swollen printing surface to which no ink was applied. This is due to the relative softness of the wax or wax-like material.

A similar type of sympathetic ink comprises a material effecting the water permeability of the paper and having the character of a size such as cellulose nitrate, cellulose acetate, synthetic or natural gums or others and a solvent therefor having a relatively low vapor pressure of not less than 0.1 mm. Hg and not more than 10 mm. Hg at 20°C. such as the mono-ethers of ethylene glycol or diethylene glycol or the acetates of such mono-ethers, preferably with the addition of soap or other non-oleaginous wetting agents. When writing with such an ink on unsized paper stock, the ink penetrates the fibers of the paper and renders the inked parts of the paper moisture resistant. On wetting the paper by immersing it in water, the portion of the paper covered by the sympathetic ink is not readily wetted. As a result thereof the print is made visible. Inks of this type, however, have also not proved fully satisfactory.

Another sympathetic ink consists of a natural or synthetic gum or resin or of a cellulose ether such as ethyl cellulose dissolved in methyl alcohol or ethyl alcohol. Such inks, however, have the disadvantage that the speed of evaporation of the alcohol solvents therein is insufficient for using them on the present day high speed printing presses. Furthermore, methyl or ethyl alcohol are highly inflammable liquids and methyl alcohol, in addition thereto, is highly toxic.

SUMMARY OF THE INVENTION

It is one object of the present invention to provide an improved sympathetic ink which, after application to a material with an absorbent surface such as paper, textile fabrics, plywood, plastics, or other absorbent media, and drying, will become visible when wetted with an aqueous agent such as water.

Another object of the present invention is to provide a simple process of producing such an improved sympathetic ink.

A further object of the present invention is to use such a sympathetic ink on an absorbent material such as paper or the like for producing thereon invisible writings and characters which will be made visible by wetting the surface of such a material.

Still another object of the present invention is to provide an applicator means for applying such a sympathetic ink to the surface of an absorbent material such as paper or the like so as to produce invisible writings and characters thereon which will become visible on wetting said surface.

Other objects of the present invention and advantageous features thereof will become apparent as the description proceeds.

In principle the sympathetic ink according to the present invention comprises the following essential ingredients:

a. As a substantially colorless inking substrate which is substantially insoluble in water there is used a water insoluble cellulose ether, preferably ethyl cellulose of the degree of substitution of at least 2.42, i.e. of at least 47.5 % ethoxyl content. An especially suitable ethyl cellulose is, for instance, the ethyl cellulose of the N-type with an ethoxyl content of 47.5 % to 49.0 % and a degree of substitution between 2.42 and 2.53 as it is supplied by Hercules Inc. of Wilmington, Delaware, or the ethyl cellulose sold by The Dow Chemical Company under the trademark "ETHOCEL STANDARD" with an ethoxyl content between 48.0 % and 49.5 %. Water insoluble ethyl cellulose of this type takes up very little water even on immersion therein and thus is dimensionally stable.

Other cellulose ethers which are insoluble in water and have about the same properties and solubilities in organic solvents as ethyl cellulose such as certain types of hydroxy propyl methyl cellulose and hydroxy butyl methyl cellulose which are not soluble in water, benzyl cellulose, or mixed ethers of this type with ethyl cellulose, or even methyl cellulose of a degree of substitution of 2.6 to 2.8 can also be used.

b. As a solvent for ethyl cellulose or the like cellulose ethers, which is substantially insoluble in water and is nonflammable, which does not form explosive mixtures with air under normal conditions, which has a relatively low surface tension permitting the same to readily penetrate the absorbent surface to be printed or written on, and which is of relatively low toxicity, there is preferably used methylene chloride $CH_2Cl_2$. Its evaporation rate is such that, for instance, solutions of ethyl cellulose in methylene chloride can advantageously be used, for instance, in modern high speed printing presses.

If a lower rate of evaporation is desired, other halogenated hydrocarbons are admixed to methylene chloride. Especially suitable has proved the admixture of trichloro ethylene $CHCl=CCl_2$ or of 1,1,1-trichloro ethane $CH_3-CCl_3$ which can be added in amounts depending upon the desired rate of evaporation. Other halogenated hydrocarbons which may be admixed to methylene chloride if the rate of evaporation is to be varied, are, among others, perchloro ethylene $CCL_2=CCl_2$. Chloroform $CHCl_3$, carbon tetrachloride $CCl_4$, and fluoro chloro hydrocarbons such as trichloro fluoro methane $CFCl_3$, trichloro trifluoro ethanes $CCl_2F-CCl_2$ and $CCl_3-CF_3$, may also be employed although they are less suitable than trichloro ethylene in mixture with methylene chloride.

The amounts of ethyl cellulose or the like cellulose ether dissolved in methylene chloride or its mixtures with other halogenated hydrocarbons are between about 0.1 % and about 10 %. The preferred amounts are between about 0.25 % and about 1.0 % depending upon the desired viscosity of the solution.

The resulting solution is useful as a fast drying sympathetic ink which can be printed from a rubber roll or can be written on paper or the like absorbent surface. After the ink has been applied to the surface, the solvent evaporates quite rapidly. when using methylene chloride as solvent, the solvent evaporates, for instance, about six times as fast as the ethanol of the prior art solutions.

After evaporation of the solvent, there remains on the surface to which the ink according to the present invention is applied, a residue of ethyl cellulose or the like cellulose ethers in the form of an invisible, but definitely outlined print or character.

On wetting the absorbent surface, such as paper, with water or immersing it therein, the water insoluble, i.e. moisture resistant cellulose ether print or character will not be wetted and will become visible. In this manner it will be possible to identify the objects to which the ink of this invention has been applied as long as they or their surfaces are wetted. On drying the wetted paper or the like, the cellulose ether print or character will again become invisible.

As absorbent material for printing or writing there can be used not only unsized paper but also sized paper provided it allows the ink to penetrate thereinto so that the ethyl cellulose or the like cellulose ether, after drying and evaporation of the solvent, is deposited within and adheres to the paper and will not be washed off by wetting with or immersing into water or aqueous solutions.

In place of paper, the ink according to the present invention can also be applied to textile fabrics, for instance, to burlap bags, to fabrics woven or knitted of synthetic fibers, to plywood provided it has a surface capable of absorbing the ink, to plaster of Paris used, for instance, as partition wall material, to wood, such as wooden boards, planks, and the like, or to any other absorbent material which may serve as a printing or writing surface. The invisible printed or written characters can be used for identifying such materials. They may also be applied thereto for advertising or other purposes.

For applying by writing the sympathetic ink according to the present invention to paper or other absorbent material there is advantageously used a hollow pen-like applicator comprising a reservoir for the ink in the holder and an end piece or part which is provided with a wick-like tip of untreated or unsized wool felt.

DESCRIPTION OF THE PREFERRED EMBODIMENTS

The following examples serve to illustrate the present invention without, however, limiting the same thereto.

EXAMPLE 1

Ten g. of ethyl cellulose are dissolved in 1,000 ml. of methylene chloride. The resulting solution is applied to unsized paper by means of a metal printing roller of a high speed printing press.

EXAMPLE 2

Two and a half g. of ethyl cellulose are dissolved in 1,000 ml. of a mixture of 700 ml. of methylene chloride and 300 ml. of trichloro ethylene. The resulting ink evaporates less rapidly than the ink of Example 1. On applying the ink to paper or fabric, for instance, by means of the above described pen-like applicator, invisible written characters are produced on the paper or fabric surface on evaporation of the solvent by drying. Said characters become visible on wetting the paper or fabric.

Of course, many changes and variations in the amounts of ethyl cellulose and other cellulose ethers and in the composition of the solvent and solvent mixtures can be made by those skilled in the art in accordance with the principles set forth hereinabove and in the claims annexed hereto.

I claim:

1. A sympathetic ink which is invisible when applied to paper or other materials having an absorbent surface and which becomes visible on wetting said paper or other material, said ink consisting of a halogenated hydrocarbon solvent consisting essentially of methylene chloride having dissolved therein between about 0.25% and about 1% of a substantially colorless, substantially water insoluble cellulose ether of a degree of substitution of at least 2.42 and an ethoxyl content of at least 47.5%.

2. The sympathetic ink of claim 1, in which the water insoluble cellulose ether is ethyl cellulose of a degree of substitution between at least 2.42 to about 2.53 and an ethoxyl content between at least 47.5% to about 49.5%.

3. The sympathetic ink of claim 1, in which the solvent is methylene chloride.

4. The sympathetic ink of claim 1, in which the solvent is a mixture of methylene chloride and trichloro ethylene.

5. The sympathetic ink of claim 1, in which the solvent is a mixture of methylene chloride and a halogenated alkane with 1 to 2 carbon atoms.

* * * * *